United States Patent [19]

Crisp et al.

[11] Patent Number: 5,290,049
[45] Date of Patent: Mar. 1, 1994

[54] PUSH CHAIR/SHOPPING TROLLEY

[75] Inventors: David J. Crisp; David C. Cocks, both of London, United Kingdom

[73] Assignee: Crisp and Wilson Limited, London, United Kingdom

[21] Appl. No.: 761,368

[22] PCT Filed: Mar. 9, 1990

[86] PCT No.: PCT/GB90/00362
§ 371 Date: Aug. 23, 1991
§ 102(e) Date: Aug. 23, 1991

[87] PCT Pub. No.: WO90/10567
PCT Pub. Date: Sep. 20, 1990

[30] Foreign Application Priority Data

Mar. 10, 1989 [GB] United Kingdom ................ 8905496

[51] Int. Cl.$^5$ ................................................ B62B 7/08
[52] U.S. Cl. ........................................ 280/30; 280/643;
280/648; 280/47.18; 280/47.26; 297/191;
297/217
[58] Field of Search ................ 280/30, 642, 643, 647,
280/648, 650, 651, 47.18, 47.25, 47.26, 47.38,
47.4; 297/191, 217

[56] References Cited

U.S. PATENT DOCUMENTS

| 2,438,829 | 3/1948 | Skolnik | 280/642 |
| 2,577,579 | 12/1951 | Hall | 280/642 |
| 4,065,177 | 12/1977 | Hyde et al. | 280/47.38 X |
| 4,116,456 | 9/1978 | Stover et al. | 280/33.993 |
| 4,248,443 | 2/1981 | Ohlson | 280/39 |
| 4,346,912 | 8/1982 | Habib | 280/644 |
| 4,682,782 | 7/1987 | Mills | 280/33.993 |
| 4,763,919 | 8/1988 | Nakao et al. | 280/47.4 X |
| 4,815,764 | 3/1989 | Carpenter | 280/769 |
| 4,953,887 | 9/1990 | Takahashi et al. | 280/647 |
| 5,056,805 | 10/1991 | Wang | 280/643 X |

FOREIGN PATENT DOCUMENTS

| 266536 | 6/1950 | Switzerland . |
| 990272 | 4/1965 | United Kingdom . |
| 2099765 | 12/1982 | United Kingdom . |

Primary Examiner—Margaret A. Focarino
Assistant Examiner—Michael Mar
Attorney, Agent, or Firm—Dann, Dorfman, Herrell and Skillman

[57] ABSTRACT

A push chair which incorporates a shopping trolley has a wheeled front frame with front wheels (22) and rear wheels (23), a seat 11 for a child, and a support member (10) for an article-carrying container (14). The frame can be folded to reduce the separation between the front and rear wheels so that the front/rear dimension of the push chair is reduced. The seat (11) of the chair is folded up at the front and the handle (40) is folded down at the rear. An auxiliary handle (16) on the support member controls the push chair when it is folded.

10 Claims, 7 Drawing Sheets

PUSH CHAIR/SHOPPING TROLLEY

TECHNICAL FIELD

This invention relates to a foldable push chair which incorporates a shopping trolley or a shopping trolley which includes a foldable seat for transporting a child. Throughout this specification the term "push chair" will generally be used for the device when in erected or unfolded condition and chair/trolley for the device in its collapsed condition.

It is known to provide a carrier on a foldable push chair on or in which goods (such as shopping) can be transported. However in some known designs, collapsing the push chair, to locate the push chair on a public service vehicle or car, interferes with the carrier's function to such an extent that removal of goods on or in the carrier is an essential prerequisite to collapsing the push chair. If a young child has been sitting in the push chair, controlling the child during the collapsing operation further complicates the operation. One example of this type of push chair is shown in U.S. Pat. No. 4,248,443 which discloses a foldable push chair that incorporates a flexible goods' container which is available to transport goods behind a back of the seat of the push chair when the latter is fully erected for use. However when the push chair of U.S. Pat. No. 4,248,443 is folded-up, not only is the goods' container not available for transport of the goods it contained, but the wheels are no longer available to provide wheeled transport.

GB-A-990272 discloses a foldable wheeled pushcart which can be set into a first erected use mode in which a seat is provided between front and rear frame parts, into a second erected use mode in which a goods' container is provided between the said frame parts and into a folded-up mode in which the front and rear frame parts close up one towards the other. In its folded-up mode the aforesaid goods' container is unusable for the transport of goods although small foldable front and rear pockets can still be used for the transport of small articles.

U.S. Pat. No. 2,577,579 discloses a collapsible push cart which has a shopping bag that can be hooked on the frame of the cart and is designed so that it can continue to be used as a shopping bag in the collapsed condition of the cart.

It is also known to provide child seating facilities in shopping trolleys (see for example U.S. Pat. Nos. 4,116,456 and 4,682,782), but these trolleys are not capable of being folded-up to facilitate transport in a vehicle.

The present invention seeks to provide an improved foldable push chair/shopping trolley which reduces the problem of collapsing the chair in the presence of transported goods and thus overcomes the problems of most prior art designs.

SUMMARY OF THE INVENTION

According to the invention there is provided a foldable push chair which incorporates a shopping trolley and comprises a frame having front and rear wheels, a seat for a child, support means for a goods' container and a handle for controlled wheeling of the push chair, the frame being foldable into a collapsed condition to reduce the separation between front and rear wheels so that the front/rear dimension of the chair/trolley is reduced, characterised in that in the collapsed condition of the chair/trolley the seat is folded up at the front of the support means and the handle is folded down to the rear of the support means, an auxiliary handle being provided for controlled wheeling of the chair/trolley on the reduced separation front/rear wheels with the goods' container still accessible for transport of shopping.

Conveniently the support means is a plate-like member provided with the auxiliary handle at its upper end. Such a plate-like member can directly provide the chair back or a padded chair back can be attached thereto or formed thereon. Such a plate-like member can define the front wall and base of a shopping box or other rigid goods' container or can provide stiffening for the front and base of a flexible shopping bag or the like.

Suitably a seat of the chair for the child is pivotally supported on a pair of front legs of the frame which carry the front wheels at their lower ends, the front legs, and a pair of rear legs supporting the rear wheels at their lower ends being adapted to close together to flank outer edges of the goods' container in the collapsed condition of the chair/trolley.

Desirably the front wheels are swivel wheels journalled on the lower end of each front leg to castor about a substantially vertical axis. The lower end of each front leg can support a pair of swivel wheels and means can be provided to lock the swivel wheels with their rotating axis normal to the front/rear direction.

Conveniently, the handle for controlling the push chair is in the form of a U-shaped member pivotally attached to the upper ends of the front legs by each limb of the U. Suitably the push chair handle can be locked in an upper- or use-position when a bifurcated pair of wheeled legs on each side of the support means are in their position of greatest divergence and the chair seat for the child is extending in usable condition forwardly from the support means and between the front pair of legs. Desirably, the chair seat is pivotally connected to the parts of the wheeled frame supporting the front wheels, via an over-centre lock, whereby release of the over-centre lock releases the chair seat from its usable condition towards its collapsed condition. "Unlocking" of the seat in this way may release the push chair handle to move into its folded-down or collapsed position, downward movement of the push chair handle drawing the lower ends of the pair of legs on each side of the support member together until they lie adjacent to each other when the push chair handle is collapsed with the bar of the U lying against the rear of the goods' container.

The over-centre lock to retain the chair seat in its usable condition provides one safety device to prevent unwanted collapse of the push chair while the seat is occupied. Preferably a second, independent, lock is provided to prevent unwanted collapse and this second lock can be a safety catch to lock the chair seat in its usable condition. The safety catch can be gravity-urged into its locking condition. Alternatively, the second lock can be associated with the U-shaped handle and act to prevent the handle being folded-down until collapse of the push chair is required.

To brake the push chair or collapsed chair/trolley, at least one wheel can be provided with a foot-operated brake. A peg spring-urged into engagement with at least one wheel of the push chair and held out of such engagement by a foot-operated brake-operating mechanism is preferred. Rear wheels on both sides of the frame can be braked together by respective spring-urged pegs operated together by a common brake-operating mechanism. Where the rear wheels are spoked, the respective pegs can locate between spokes when spring-urged into their braking condition.

BRIEF DESCRIPTION OF THE DRAWINGS

Two embodiments of push chair/shopping trolley in accordance with the invention will now be described, by way of example, with reference to the accompanying schematic drawings, in which.

DESCRIPTION OF PREFERRED EMBODIMENTS

Figure 2:
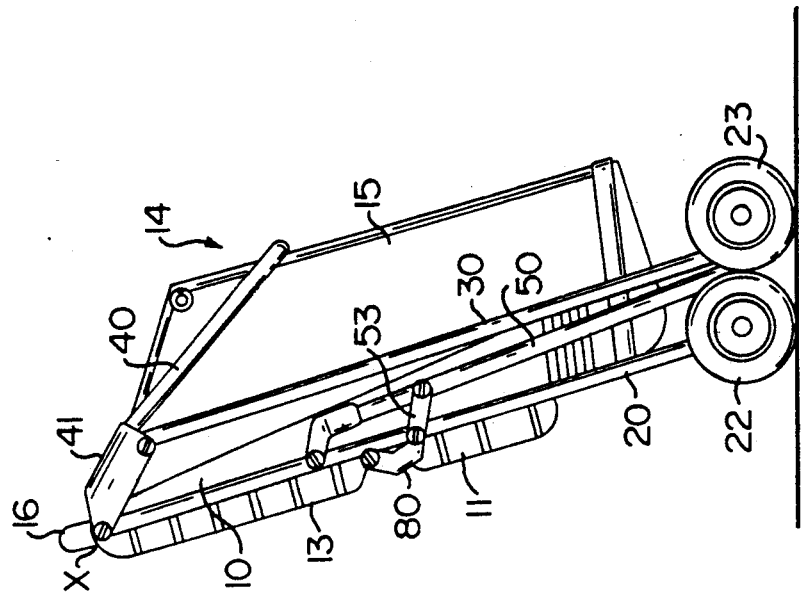
FIG. 2 is a side view of the push chair of FIG. 1 in its collapsed condition for use as a shopping trolley.
Figure 1:
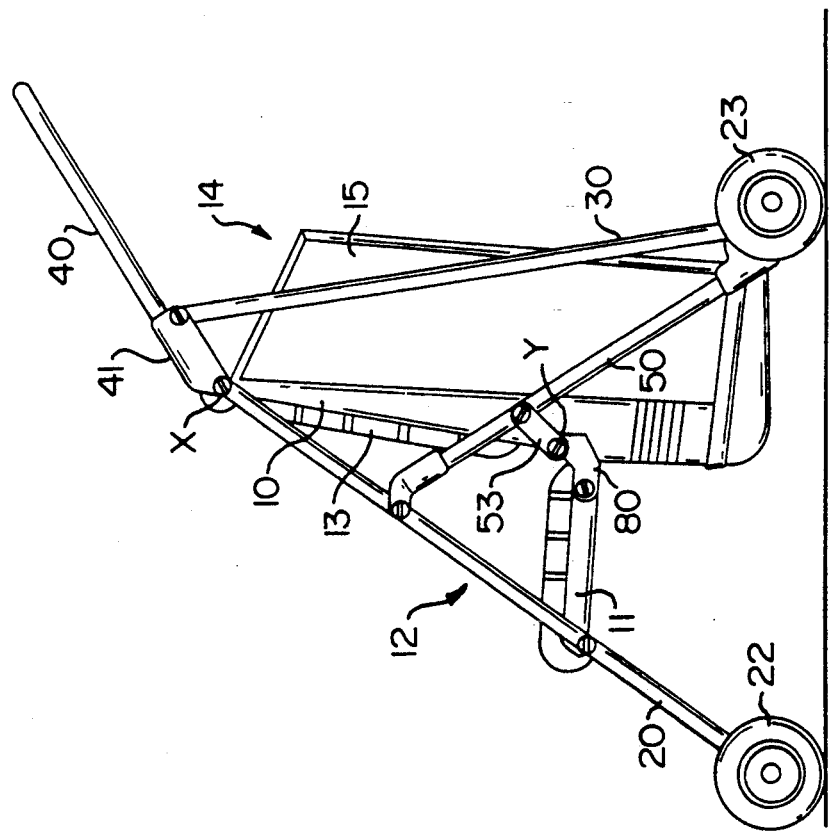
FIG. 1 is a side view of a first embodiment of push chair in its erected condition.

Both embodiments of push chair illustrated in the drawings have a structure based on a wheeled frame having front wheels and rear wheels, which frame is foldable into a collapsed state to reduce the separation between front and rear wheels so that the front/rear dimension of the chair/trolley is reduced. Both embodiments have a central plate-like support member 10 which, forwardly, provides part of a child's chair 12 and rearwardly, provides support for a goods' container 14. Both embodiments have the support member 10 located between a pair of wheeled bifurcated front legs 20, 21 and rear legs 30, 31, with a U-shaped handle 40 linking the legs 20, 30 on one side to the legs 21, 31 on the other side. Both embodiments have a foldable U-shaped handle 40 for controlled wheeling of the push chair in the erected condition and an auxiliary handle 16 for controlled wheeling of the chair/trolley in the collapsed condition.

The first embodiment has a link strut 50, 51 extending between a lower end of the rear leg 30, 31 and an intermediate point on the adjacent front leg 20, 21, which link strut carries, a further link 53 extending between the link strut 50 and the support member 10. An over-centre coupling 80 is provided between the support member 10 and one end of the bottom support or seat 11 of the child's chair 12. In the case of the second embodiment, the over-centre coupling 80 is still secured to the support member 10 but the further link 53 does not share a common pivot point with over-centre coupling 80. Both embodiments have the back support 13 of the child's chair mounted on an upper part of the front face of the support member 10, and a flexible shopping bag 15 located in part in a recess defined by the rear and upwardly-facing lower surfaces of the support member 10.

One feature of difference between the two embodiments is in the use of swivel wheels 22 at the lower end of the legs 20, 21 in the second embodiment which are capable of castoring about a vertical axis. In the embodiment of FIGS. 1 to 5 a non-castoring wheel 22 at the end of an axle 26 is used on each front leg 20, 21.

A further feature of difference between the illustrated embodiments is the provision of a foot rest 24 between the legs 20, 21 in the second embodiment, a feature not found in the first embodiment. The foot rest 24 can serve to stabilise the collapsed chair/trolley and prevent toppling (see FIG. 8).

In both embodiments, the pivotable connection between the rear edge of the seat 11 and the support member 10 provides an "over-centre" lock when the seat 11 is set for sitting upon, whereby the weight of a child in the chair 12 prevents unwanted collapse of the push chair. In the case of the first embodiment, this over-centre lock is provided by a coupling 80 on each side of the seat 11. In the second embodiment it is provided by a link piece 80 of arcuate shape, discussed in greater detail hereafter. Because of this "over-centre" lock, it is necessary to manually lift the rear edge of the seat 11 beyond the in-line position of the pivotal connection in order to initiate a collapse of the push chair but once this in-line position has been passed, full collapse can be accomplished merely by pressing down on the bar of the U-shaped handle 40 until it contacts the rear surface of the bag 15, at which time the front and rear legs have become sensibly parallel and the front wheels 22 and rear wheels 23 have moved into close proximity, the front legs flanking the outer edges of the support member 10. Thus the method of folding-up of the seat 12 of both embodiments allows collapse of the push chair without the user having to bend over to any great extent or for any significant period. Further, the design of both embodiments allows the push chair to be used in its collapsed state as a satisfactory free-standing wheeled shopping trolley so that erection and/or collapse of the push chair to provide or remove the seating facility can be effected without the need to disturb goods located in the goods' container 14.

To provide added security of locking of the push chair in its erected state, a gravity-urged safety catch (not shown) can be provided in the first embodiment which locks the seat 11 in its use condition, such a catch having to be released before the over-centre locking of the seat 11 created by the coupling 80 can be overcome.

Figure 6:
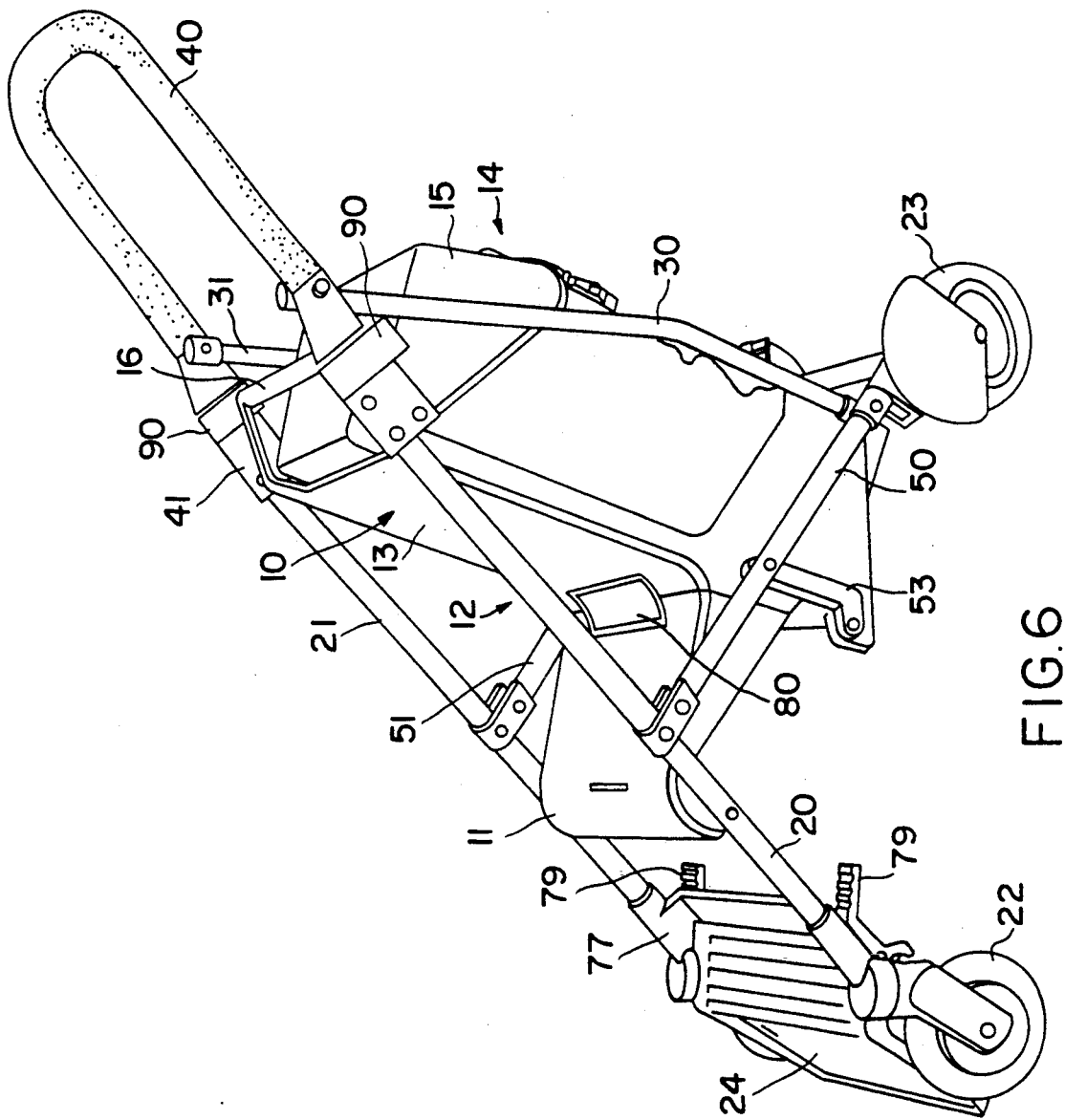
FIG. 6 is a partial front view of a second embodiment of push chair/shopping trolley without seat padding but with a shopping bag in place.
Figure 7:
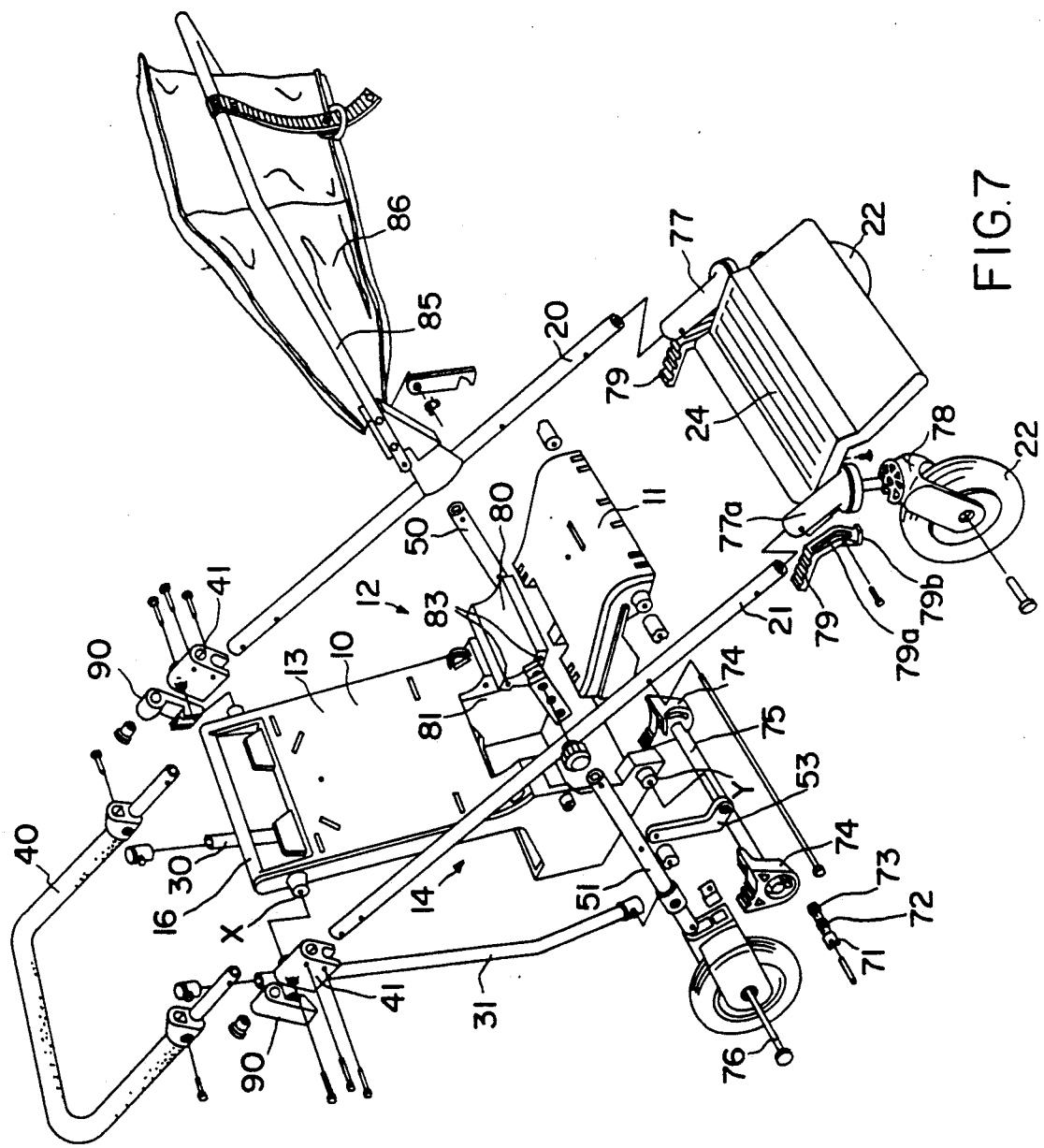
FIG. 7 is an exploded view of the second embodiment of push chair/shopping trolley without seat padding or the shopping bag in place.
Figure 8:
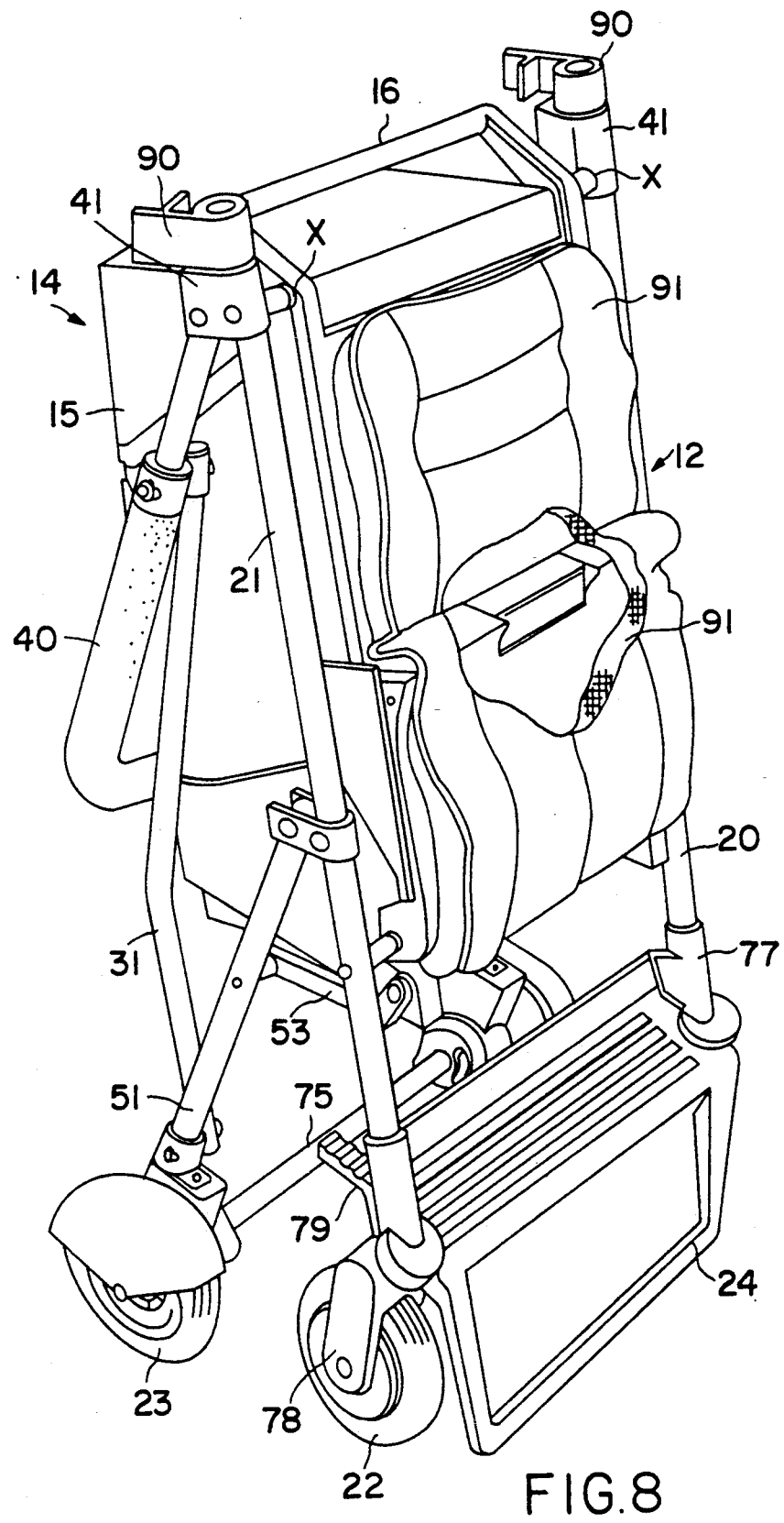
FIG. 8 is a partial front view of the second embodiment in collapsed condition but with seat padding and a shopping bag in place.

In the second embodiment, the added security of locking is provided by a handle lock. As shown in FIGS. 6, 7 and 8, a pivoted locking cup 90 is provided at the upper end of each leg 20, 21 to engage with the lower end of each arm of the U-shaped handle 40. Desirably a measure of resilience is provided in the cup 90 so that it "snaps" into place when locking the handle 40 in its use position.

The moulded plate-like support member 10 in both embodiments has a pair of upper bearing holes X by which it is pivotally connected to the front legs 20, 21 and, via a knuckle 41, is pivotally connected to the rear legs 30, 31 in the first embodiment. The member 10 in FIGS. 1 to 5 has a lower pair of bearing holes Y which are pivotally connected to the coupling 80, although this is not clearly shown in FIG. 2.

The wheeled frame of the second embodiment has the rear legs 30, 31 pivotally linked at their upper ends to the arms of the handle 40 at positions just above each knuckle 41 and pivotally linked at their lower ends to the respective link strut 50, 51.

Figure 5:
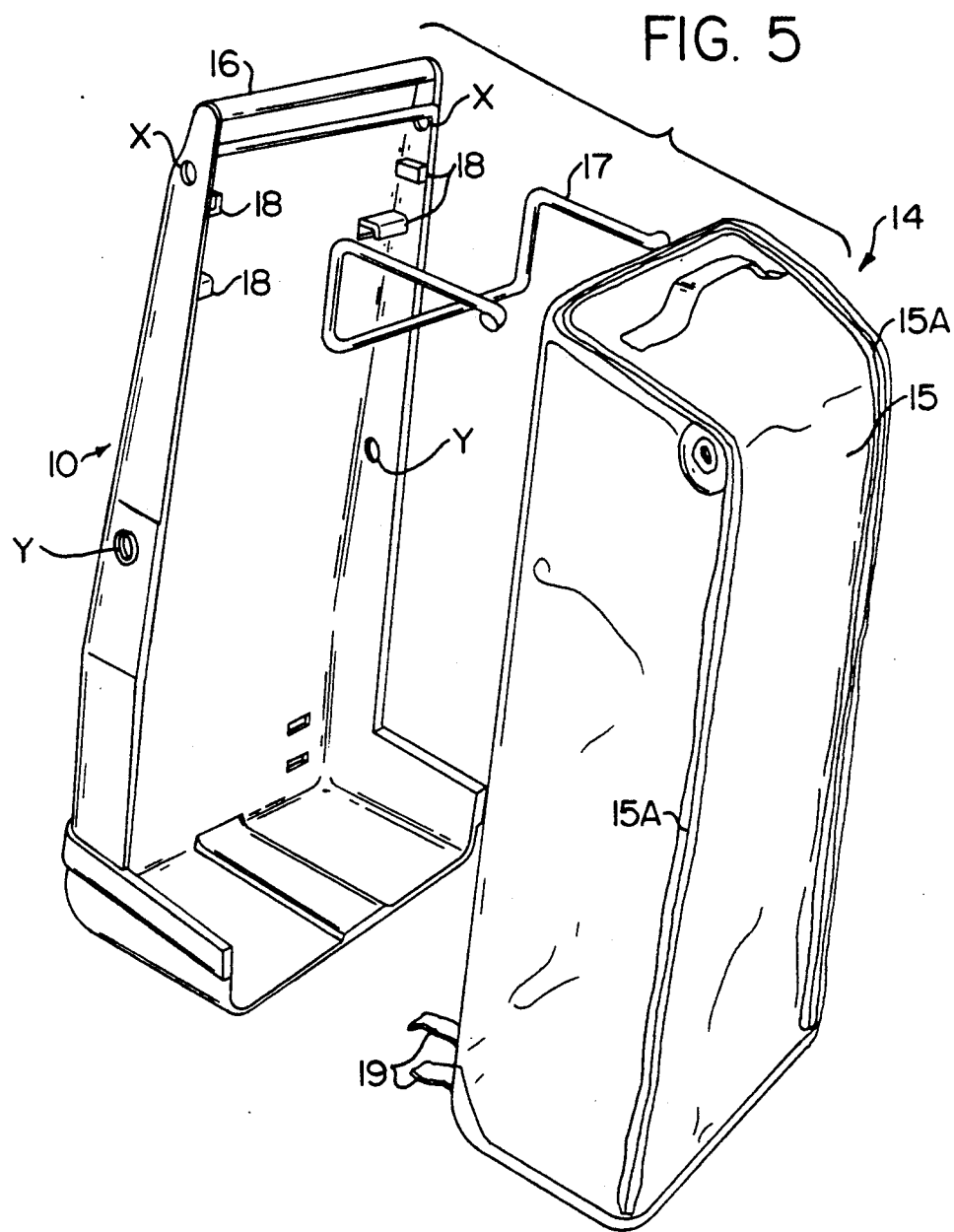
FIG. 5 is an exploded view of the support member and shopping bag of the push chair/shopping trolley of FIGS. 1 to 4.

FIG. 5, shows a preferred arrangement for the goods' container 14 which is a flexible bag 15, having one or more zip fasteners or other closure means 15A to permit easy opening/closing of the bag and a stiffening bar 17 clipped in place against projections 18 formed on the support member 10. Straps 19 (see FIG. 5) can be used to secure the lower end of the bag 15 in place against the support member 10. It should be appreciated however, that since the collapsing of the chair into a chair/trolley does not interfere with the goods' container 14 in any way any convenient form of bag 15 could be used. Hence a flexible bag 15 is not an essential requirement and a box with rigid walls can be used for the container 14. Such a rigid box could be formed integrally with the support member 10.

Figure 3:
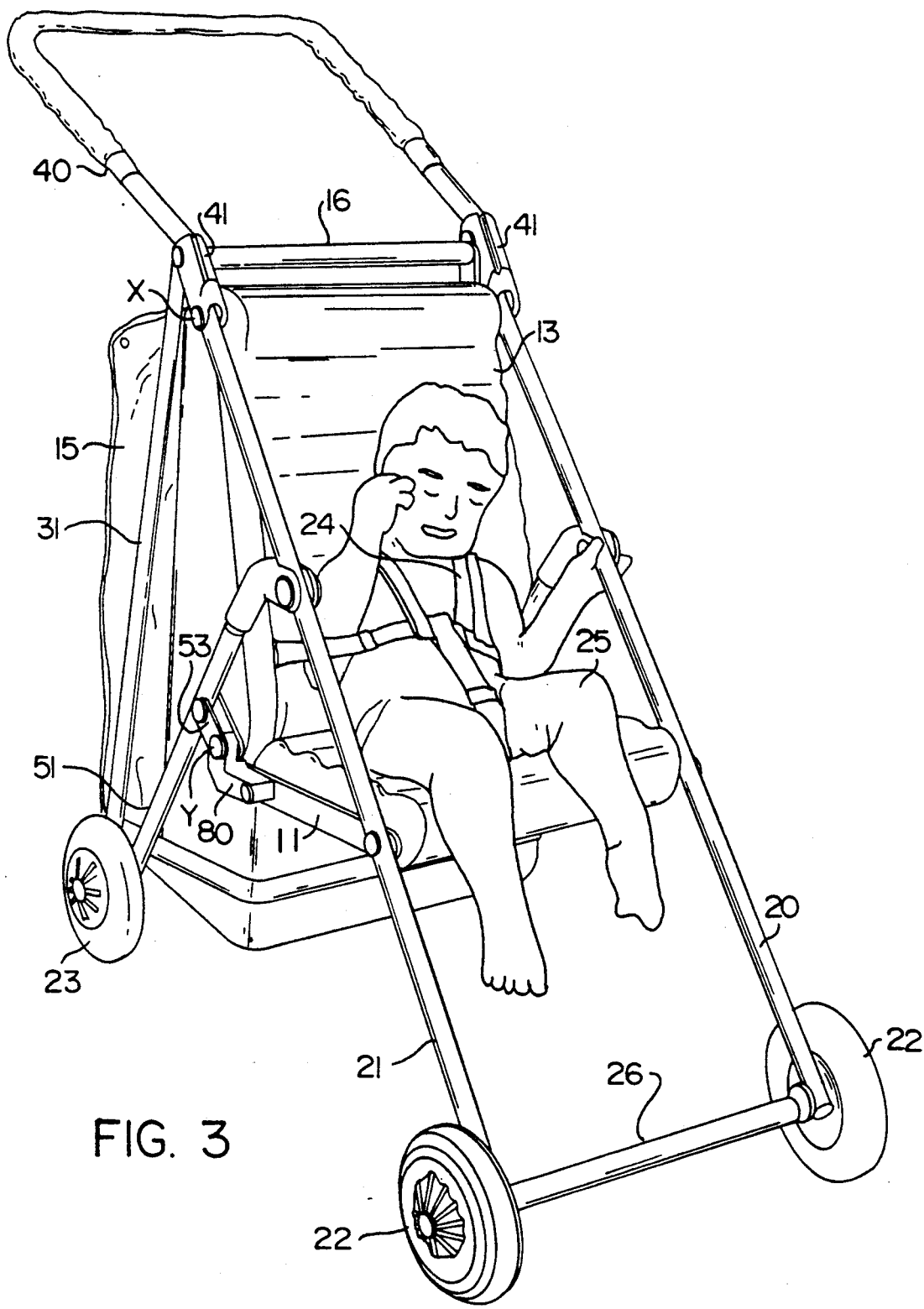
FIGS. 3 and 4 are perspective views of the push chair/shopping trolley of FIGS. 1 and 2, respectively, in the erected and in the collapsed conditions.
Figure 4:
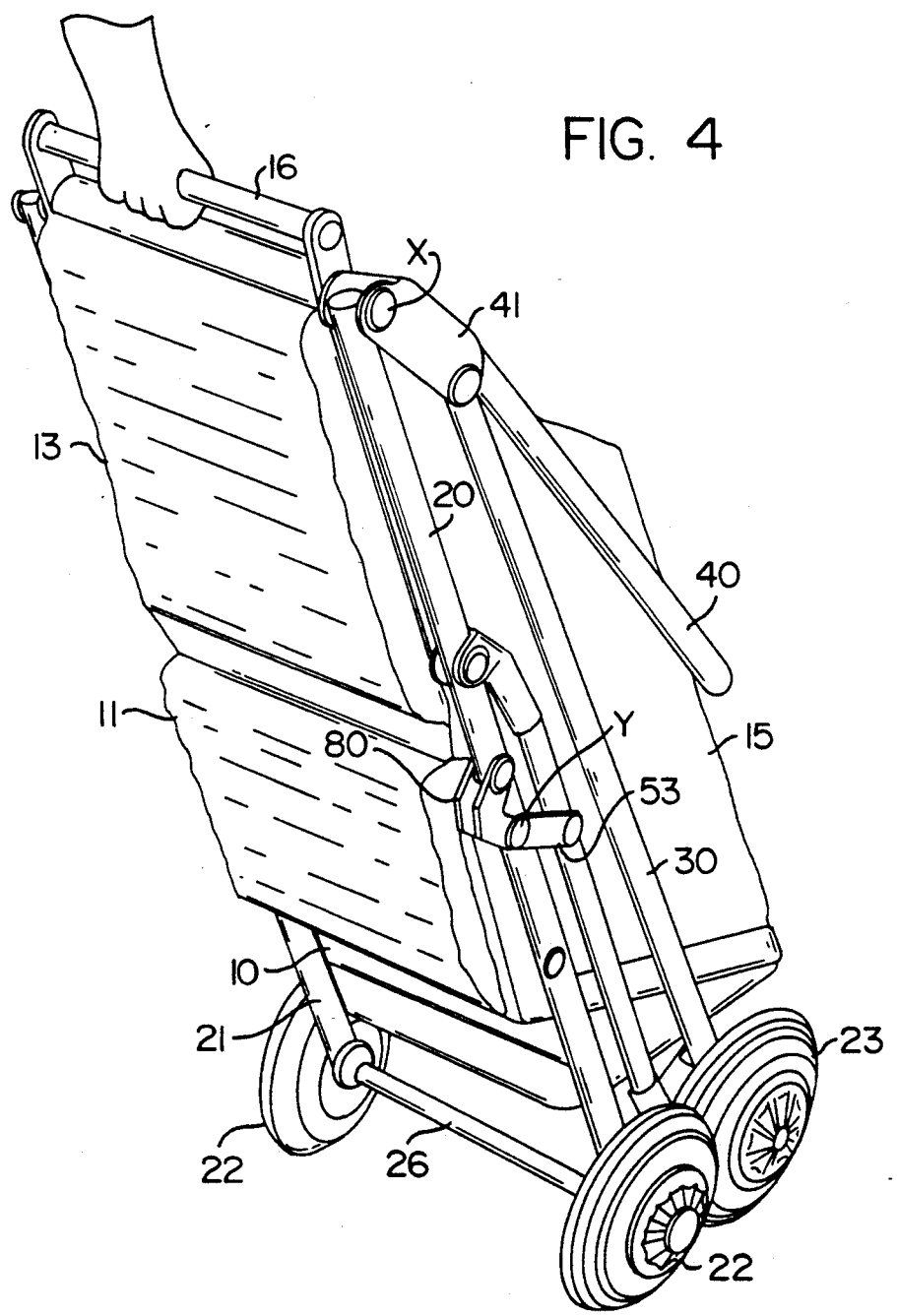

Although shown only in FIG. 3 of the drawings, the chair 12 in each embodiment would normally be provided with brackets or the like to carry a releasable harness 24 for securing a child 25 in the chair and optionally also some provision (e.g. a removable canopy) for protecting a child on the chair 12 from inclement weather.

The upholstery on the seat 12 can take many forms. FIGS. 1 to 4 show permanently attached "padding" while FIG. 8 shows removable foam filled upholstery 91 secured in place over the moulded members 10 and 11.

The second embodiment shows a number of further advantageous features, now described with reference to FIG. 7.

These include:

a) rear wheel brakes which utilise a brake peg 71 for each rear wheel surrounded by a tension spring 72. Each peg 71 is dimensioned to locate between two adjacent spokes of the respective rear wheel 23 when urged by the spring 72 into its extended braking position. The springs are prevented from projecting the pegs by virtue of an enlarged head 73 of each peg engaging a cam-surface in a respective brake lever 74. A pair of cam-providing brake levers 74 are located at opposite ends of a linking tube 75 which surrounds the rear wheel axle 76, whereby foot-operating either lever 74 releases both pegs 71 to move under spring urging into the path of the spokes of the respective rear wheel to locate therebetween as the pegs are allowed to move out or, should a peg initially engage a spoke, when the wheel is turned slightly after the cam surface holding the pegs 71 in has moved away from the head 73.

b) an anti-swivel feature is provided to stop the castor-mounted front wheels 22 swivelling about a vertical axis. As shown in FIG. 7, this feature is provided by foot-operated pedals 79. Each pedal is frictionally held up by engagement of a bar 77a on the lower wheel support 77 in a groove 79a in each pedal, but when released drops, under gravity, so that an end 79b thereof can locate in a recess provided in the bracket 78 of the respective front wheel. Such an antiswivel feature can be very useful when converting the chair/trolley into its collapsed condition and can be made to automatically prevent castoring when the push chair is collapsed.

c) the over-centre lock 80 between the rear end of the seat 11 and the support member 10 is a modified pivot construction provided between the seat 11 and the support member 10. An arcuate piece indicated by 80 in FIGS. 6 and 7 serves as the over-centre lock and is located in respective recesses 81, 82 in the member 10 and seat 11 and is pivotally linked to both by means (not shown) passing through holes 83.

d) the vital further links 53, which tie the link struts 50, 51 to the support member 10, are moved downwardly to pivot to the bottom part of the support member 10.

e) an add-on frame 85 can be provided which clips onto the frame of the push chair and converts the seat 11 to serve as part of the base of a small cot 86.

The legs 20, 21, 30 and 31 and the link struts 50, 51 can be made from metal or plastics rod or tubing, the support member 10 and seat 11 from moulded plastics material (e.g. ABS or fibre-reinforced resin) or pressed metal and (where provided) the bag 15 from a water-resistant woven material (e.g. nylon). Padding 91 on the chair 12 can be of an expanded closed-cell plastics material or a resilient pad clad in a waterproof facing.

In place of single front or rear wheels 22, 23, tandem pairs of wheels can be used at the front and/or the back of the chair.

We claim:

1. A foldable push chair which incorporates a shopping trolley comprising: a frame having a pair of front legs and a pair of rear legs, a seat for a child, a wheel attached to the lower end of each of said legs, a handle, a back support member pivotally attached to said pair of front legs, said back support member serving as a backrest, an article carrying container attached to the rear of said support member, and an auxiliary handle attached to the upper end of said support member, said front pair of legs being pivotally attached to said rear pair of legs and said handle, such that said handle is usable for pushing the push chair when the front and rear pairs of legs are in an extended condition of the push chair and said handle being folded against the rear of the container when the front and rear pairs of legs are brought together in a folded condition of the push chair, and said auxiliary handle being usable for controlling the push chair as a shopping trolley when the push chair is in the folded condition.

2. A foldable push chair as claimed in claim 1, in which the back support member is a plate-like member provided with the auxiliary handle at its upper end.

3. A foldable push chair as claimed in claim 1, wherein said back support member comprises a padded chair back.

4. A foldable push chair as claimed in claim 2, in which the plate-like member comprises the front wall and base of the article-carrying container.

5. A foldable push chair as claimed in claim 1, in which the seat of the chair is pivotally supported on the pair of front legs of the frame, said legs being adapted to close together to flank outer edges of the container in the folded condition of the push chair.

6. A foldable push chair as claimed in claim 5, in which the seat of the chair is connected to the support means by a coupling providing an over-centre lock, to lock the push chair in its erected condition.

7. A foldable push chair as claimed in claim 6, in which the handle for controlling the push chair is in the form of a U-shaped member pivotally attached to the upper ends of the front legs by each limb of the U.

8. A foldable push chair as claimed in claim 7, wherein said front and rear legs in use position define a bifurcated pair of wheeled legs on each side of the support member, and the chair seat extends forwardly from the support member and between the front pair of legs.

9. A foldable push chair as claimed in claim 8, in which release of the chair seat from its use condition towards its folded condition releases the push chair handle to move into its folded-down or collapsed position, downward movement of the push chair handle drawing the lower ends of the pair of legs on each side of the support means together until they both lie adjacent to each other when the push chair handle is collapsed with the bar of the U lying against the rear of the container.

10. A foldable push chair as claimed in claim 9, in which a safety catch is also provided to lock the push chair handle in its use-position.

* * * * *